(12) United States Patent
Zoratti et al.

(10) Patent No.: US 7,098,778 B1
(45) Date of Patent: Aug. 29, 2006

(54) IMPACT SENSOR ASSEMBLY AND METHOD OF ATTACHING SAME TO A VEHICLE

(75) Inventors: Paul K. Zoratti, South Lyon, MI (US); Jeffrey A. Bochenek, Milford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/070,886

(22) PCT Filed: Sep. 27, 2000

(86) PCT No.: PCT/US00/26542

§ 371 (c)(1),
(2), (4) Date: Apr. 9, 2004

(87) PCT Pub. No.: WO01/24137

PCT Pub. Date: Apr. 5, 2001

Related U.S. Application Data

(60) Provisional application No. 60/156,165, filed on Sep. 27, 1999.

(51) Int. Cl.
*B60Q 1/00* (2006.01)

(52) U.S. Cl. .................. 340/436; 340/669; 340/457.1; 340/384.6; 280/728.1; 280/734; 701/36; 701/45

(58) Field of Classification Search ................ 340/436, 340/438, 669, 457.1, 467, 384.6, 501, 903, 340/904; 280/728.1, 734–735; 701/36, 701/45

See application file for complete search history.

(56) References Cited

U.S. PATENT DOCUMENTS

| | | | |
|---|---|---|---|
| 3,917,020 A * | 11/1975 | Saab ........................ | 180/276 |
| 3,990,040 A | 11/1976 | Gleitz et al. | |
| 4,830,461 A | 5/1989 | Ishiharada et al. | |
| 4,951,985 A | 8/1990 | Pong et al. | |
| 4,988,862 A | 1/1991 | Beltz | |
| 5,141,193 A * | 8/1992 | Behr ........................ | 248/309.1 |
| 5,157,372 A | 10/1992 | Langford | |
| 5,195,776 A * | 3/1993 | Sakakida et al. ........... | 280/732 |
| 5,299,387 A | 4/1994 | Miller et al. | |
| 5,309,135 A | 5/1994 | Langford | |
| 5,419,407 A * | 5/1995 | Meyer et al. ............... | 180/274 |
| 5,428,534 A | 6/1995 | Wetzel et al. | |
| 5,445,412 A | 8/1995 | Gillis et al. | |
| 5,502,301 A | 3/1996 | Lord | |
| 5,528,228 A | 6/1996 | Wilk | |

(Continued)

FOREIGN PATENT DOCUMENTS

DE 42 37 404 A1 5/1994

(Continued)

*Primary Examiner*—Thomas Mullen
*Assistant Examiner*—Daniel Previl
(74) *Attorney, Agent, or Firm*—Sally J Brown

(57) ABSTRACT

An Impact sensor assembly provides a modular housing for vehicle impact sensors. The assembly comprises an impact sensor, an upper housing member, a lower housing member and a connector for establishing an electrical connection between the assembly and an appropriate vehicle system. The assembly may further include electronics for processing signals received from the sensor. The lower housing member receives and retains the sensor, and closeably interacts with the upper housing member to encase the sensor. The assembly defines structural features that ensures its proper installation into a vehicle. The preferred embodiment assures proper functioning of deformation impact sensors. A method of installing the assembly provides a process for rapid and proper installation of the assembly into a vehicle.

21 Claims, 3 Drawing Sheets

U.S. PATENT DOCUMENTS

| | | | |
|---|---|---|---|
| 5,583,476 A | 12/1996 | Langford | |
| 5,623,246 A * | 4/1997 | Kruse et al. | 340/438 |
| 5,682,137 A | 10/1997 | Li | |
| 5,793,005 A * | 8/1998 | Kato | 200/61.45 R |
| 5,797,623 A | 8/1998 | Hubbard | |
| 6,015,163 A | 1/2000 | Langford et al. | |
| 6,031,484 A | 2/2000 | Bullinger et al. | |
| 6,169,479 B1 * | 1/2001 | Boran et al. | 340/436 |
| 6,204,756 B1 * | 3/2001 | Senyk et al. | 340/438 |
| 6,236,329 B1 | 5/2001 | Kyrtsos | |

FOREIGN PATENT DOCUMENTS

| | | |
|---|---|---|
| EP | 0775613 A2 * | 11/1996 |
| EP | 0 775 613 A2 | 5/1997 |
| FR | 2 693 795 | 1/1994 |

* cited by examiner

IMPACT SENSOR ASSEMBLY AND METHOD OF ATTACHING SAME TO A VEHICLE

CROSS REFERENCE TO RELATED APPLICATION

This application claims the benefit of U.S. Provisional Application No. 60/156,165, filed Sep. 27, 1999.

FIELD OF THE INVENTION

The present invention relates to an assembly for vehicle impact sensor elements and a method of attaching the assembly to a vehicle. More specifically, the invention relates to a modular assembly for impact sensors and a method for rapid, easy and proper installation of the assembly into a vehicle.

BACKGROUND OF THE INVENTION

Almost all passenger motor vehicles presently produced include some type of impact deployed restraint system to protect vehicle occupants, or others, during a vehicle impact event. Such restraint systems may include, for example, front and side airbags within the passenger compartment, side curtains, inflatable seat belts and seatbelt pretensioners. A restraint system may also include restraints for the protection of pedestrians involved in impacts with the vehicle, such as pedestrian airbags and hood release mechanisms. Sensing systems typically control the deployment of such restraints by detecting the occurrence of a vehicle impact event.

Sensing systems detect impact events through sensor elements, which are typically positioned at various areas prone to impact events throughout the vehicle. Sensor elements detect an impact event and, through various principles of operation, trigger deployment of one or several passive restraints in the vehicle as appropriate. Various types of sensors are utilized. For example, sensors comprised of piezoelectric cables, accelerometers, pressure sensors and crush-zone switches are frequently used. Also, deformation sensors can be used. These sensors generate an output, such as an electrical signal, that varies depending on the extent of deformation of the sensor. These sensors operate by physical participation in the impact event, i.e., they directly detect vehicle deformation. Therefore, these sensors can be utilized to detect an impact event and also to gather information regarding the rate and extent of deformation.

One type of deformation sensor is in the form of an elongated strip which may be oriented along a side door or bumper of a motor vehicle. Due to the configuration of some sensors, they are cumbersome, and their placement throughout the vehicle and installation can be a complex and time-consuming task. The modular assembly approach to vehicle manufacture increasingly demanded and practiced by automobile manufacturers has affected the design and componentry of motor vehicles in numerous ways. Several components are often joined together into an assembly or module, which is subsequently installed into the vehicle as a whole. This modular approach is designed to minimize the amount of assembly time during final production of a vehicle. Providing a modular approach to the installation of elongated impact deformation sensors could save time and make the task more manageable.

The design of an assembly for impact sensors must accommodate the functional qualities of the sensors, allowing the sensor to properly function even though contained within a housing. For example, deformation sensors must retain the ability to bend or deform once installed in the vehicle due to their mechanism of operation. For these deformation sensors, the ability of the sensor to bend or deform as the vehicle deforms is critical to the proper operation of the sensor. Therefore, any assembly or housing for these sensors must address this issue.

Also due to their mechanism of operation, deformation sensors may not detect an evenly applied impact that spans the length of the sensor. If such an impact occurs, it may force the entire sensor inward, not causing the bend or deformation of the sensor necessary to detect the impact. Conversely, deformation sensors may improperly generate a deployment signal due to minor deformations of the sensor element. For example, an unprotected sensor element may bend or deform in response to a rock or other object thrown at the vehicle. An ideal assembly for these sensors would therefore ensure proper deformation of the sensor during sensor-wide impacts while protecting the sensor from insignificant environmental impacts. Also, as with any vehicle component for installation during the manufacturing process and to be consistent with the goal of the modular approach to vehicle manufacturing, any impact sensor assembly should facilitate simple and efficient installation. The design of the assembly should be such that it is easily placed in its proper position and orientation. Furthermore, the assembly should allow for rapid connection to the necessary vehicle systems, such as a restraints control module.

Considering this background, there is a need for an assembly that provides a protective barrier for elongated impact sensor elements while ensuring proper operation during significant impact events. The assembly must allow proper functioning of the sensor and should facilitate the installation process, allowing for rapid and correct installation.

SUMMARY OF THE INVENTION

The present invention is directed to an impact sensor assembly that satisfies the above-identified needs. A sensor assembly according to the present invention comprises an upper housing member, a lower housing member that defines a channel for receiving, an impact sensor element, and a connector for creating an electrical connection between the assembly and an appropriate vehicle system. The upper and lower housing members close upon eachother in a clam shell manner to encase the sensor element within a housing. A seal may be formed between the two housing members. The housing members define structural elements that assure proper and efficient installation of the assembly into a vehicle. The assembly may also include, mounted on the housing, electronics for processing signals relayed from the impact sensor element.

The preferred embodiment is directed at an assembly for deformation impact sensors. As such, the preferred embodiment addresses the above-identified issues that relate to these sensors. The assembly of the preferred embodiment comprises a housing that retains a deformation sensor adjacent a layer of compressible material, thereby allowing the deformation necessary for proper operation of these sensors. The housing elements closeably interact, protecting the sensor from environmental contamination and inadvertent and/or insignificant impacts. Furthermore, the housing of the preferred embodiment defines structural elements that ensure bending or deformation of the sensor during an impact that is evenly applied over the entire span of the sensor.

The present invention is also directed at a method of installing an impact sensor assembly into a vehicle. The invention provides a simple and rapid method of properly installing a sensor assembly incorporating the features of the present disclosure. The method comprises the steps of securing a mounting member of an appropriate size and profile to the portion of the vehicle to be monitored by the assembly. Preferably, a c-channel is used as the mounting member. Next, the assembly is slid into the mounting member. By interacting with the structural features of the assembly, the mounting member receives and retains the assembly in a proper position and orientation. Based on the dimensional configurations of the assembly and the mounting member, improper, i.e., inverted, etc., installation is not possible. After positioning in the mounting member, the sensor is secured to the vehicle. Finally, the connector of the assembly is mated to a connector on the vehicle for the appropriate system. Installation of the impact sensor assembly is then complete.

Accordingly, an object of the present invention is to impart a modular structure onto vehicle impact sensor elements by providing an impact sensor assembly that facilitates rapid, easy and proper installation.

Another object of the present invention is to provide a housing that protects an impact sensor element from environmental contamination.

A further object of the present invention is to provide a housing that retains a compressible material that ensures that an encased deformation sensor can still bend and/or deform in response to a sufficient impact event.

A still further object of the present invention to is provide a housing that defines structural elements that ensure proper operation, i.e. bending and/or deformation, of a deformation sensor in response to an impact force applied evenly over the span of the sensor.

A still further object of the present invention is to provide a sensor element assembly that is simple and cost-efficient to properly install into and connect to a vehicle.

A still further object of the present invention is to provide a method of installing the sensor element assembly into a vehicle.

An advantage of the present invention is that the housing defines structural elements that ensure its proper installation into a vehicle.

Another advantage of the present invention is that the method of installing the sensor assembly into the vehicle allows for optimum placement of the assembly relative to the structural elements of the vehicle.

Further objects and advantages of the present invention will become apparent by reference to the following description of the preferred embodiment and appended drawings wherein like reference numbers reflect the same feature, element or component.

DETAILED DESCRIPTION OF THE PREFERRED EMBODIMENTS

Figure 1:
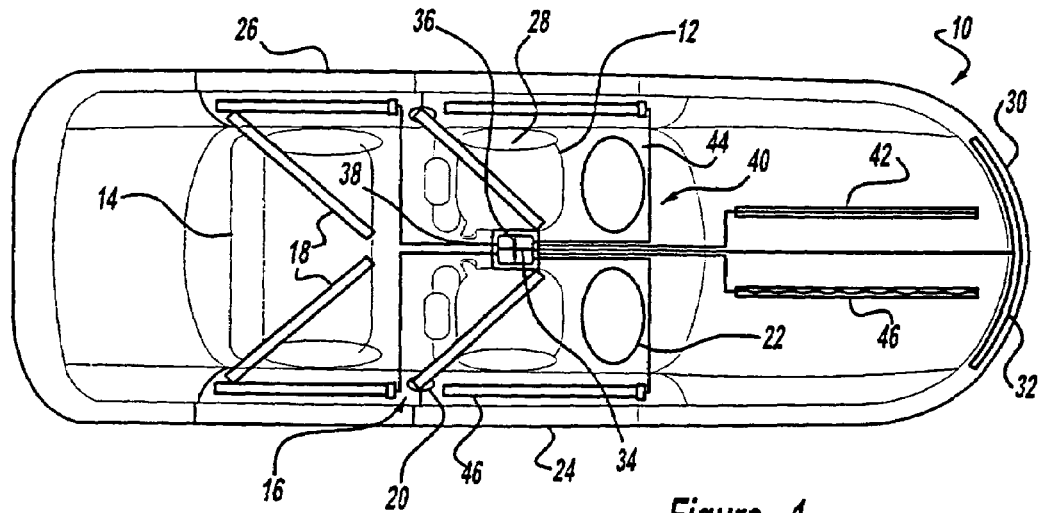
FIG. 1 is a schematic plan view of a vehicle, including sensor assemblies in accordance with the present invention.

A vehicle 10 having several deployable restraints and including the present invention is illustrated in FIG. 1. The vehicle 10 has front 12 and rear 14 seats in a passenger compartment 16. Mounted in proximity to each seat is a seat belt 18, each of which may be equipped with pretensioners 20 as deployment restraints. Mounted in front of the two front seats 12 are front airbags 22. The illustrated vehicle 10 includes two front doors 24 and two rear doors 26; all of which may include a side airbag 28 mounted alongside, adjacent the front 12 and rear 14 seats. The vehicle 10 has a front bumper 30 with a pedestrian airbag 32 mounted in proximity to the bumper 30.

The vehicle 10 may be equipped with accelerometer type crash sensors, a first frontal accelerometer 34 oriented to sense longitudinal acceleration of the vehicle 10 and a second side accelerometer 36 oriented to sense side-to-side (i.e., lateral) acceleration. Alternatively, the two accelerometers 34, 36 can be replaced with a single dual-axis acceleration sensor if so desired. These accelerometers 34, 36 are electrically connected to and in communication with a restraints control module 38.

The impact sensing system 40 of the illustrated vehicle comprises several sensor elements 42 located at various positions throughout the vehicle 10, a restraints control module 38, and electrical connections 44 between the sensor elements 42 and the restraints control module 38. The sensor elements 42 may be disposed within impact sensor assemblies 46 according to the present invention, and utilized in several areas of the vehicle 10. Generally, the sensor elements 42 will be mounted in areas around the body of the vehicle 10 in which impact sensing is desired, i.e., areas in which impact events are known to occur. For example, a sensor element 42 may be disposed within a front door 24 of the vehicle 10 for detecting side impact events. Also, a sensor element 42 may be disposed near or within a bumper 30 of the vehicle 10. So disposed, the sensor element 42 can be utilized to monitor for impact events involving pedestrians. Other locations may, of course, be desirable. The impact sensor assembly 46 of the present invention facilitates installation and proper placement, no matter where the sensor element 42 is ultimately placed within the vehicle 10. Furthermore, the method of attachment disclosed herein can be utilized throughout the vehicle 10.

Figure 2:
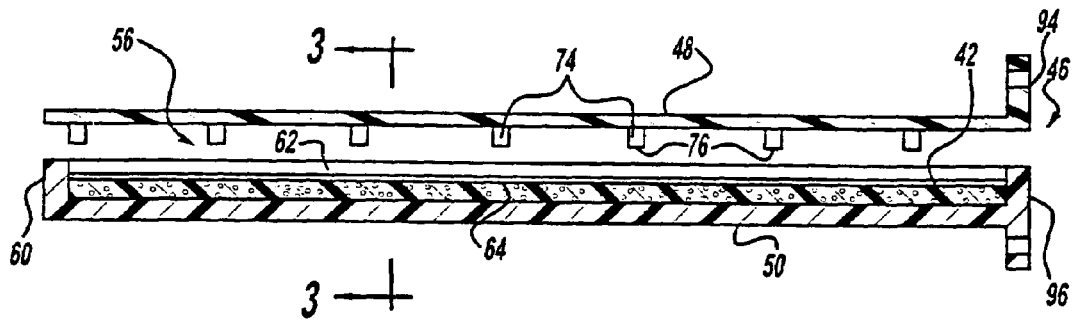
FIG. 2 is a lengthwise, cross-sectional view of a sensor assembly in accordance with the present invention.

As best shown in FIG. 2, the impact sensor assembly 46 of the present invention houses a sensor element 42 within the vehicle 10. The sensor assembly 46 comprises a first or upper housing member 48, a second or lower housing member 50, an impact sensor element 42, and an electrical connector 52, illustrated in FIG. 5, such as a pigtail harness or an integrally formed connector, for connecting the assembly to the electrical connections 44 of the restraints control module 38. The sensor assembly 46 may also include electronics 54 necessary for processing signals received from the impact sensor element 42.

Preferably, the upper 48 and lower 50 housing members are comprised of a suitable plastic material, capable of being formed through an injection molding process.

The upper housing member 48 and lower housing member 50 closeably interact with each other to form a housing that separates an interior compartment 56 from the exterior. This interaction between the upper housing member 48 and the lower housing member 50 can be accomplished in a variety of manners, including connection by threaded fasteners through an opening in both members 48, 50 and including a nut, a tab and corresponding slot arrangement, and a tongue and corresponding groove arrangement. A suitable seal, such as a rubber gasket or bead of sealant, may be disposed around the interface between the upper 48 and lower 50 housing members. Ultimately, the interaction between the upper 48 and lower 50 housing members is such that it encases the sensor element 42. That is, the upper 48 and lower 50 housing members surround the sensor element 42, shielding it from the external environment.

The lower housing member 50 defines a channel 58 which ultimately is situated within the interior compartment 56 of the assembly 46 once the upper 48 and lower 50 housing members are connected. The channel 58 is a depression in the lower housing member 50 that receives the sensor element 42. The channel 58 preferably extends nearly the entire length of the lower housing member 50, leaving only upstanding walls necessary for the interaction with the upper housing member 48. Thus, the lower housing member 50 defines two end walls 60 and two side walls 62. The channel 58 must have a length, width and depth at least equal to the corresponding dimensions of the sensor element 42 being disposed therein. Preferably, the channel 58 has a length and width slightly larger than the corresponding dimensions of the sensor element 42, allowing for slight movement of the sensor element 42 disposed therein. Of course, channels 58 of varying sizes can be utilized. Preferably, the channel 58 has dimensions appropriate for receiving and retaining the sensor element 42 being housed by the assembly 46.

The electrical connector 52 can comprise a simple pigtail connector in which wires extending from the communicative elements of the electronics 54 of the sensor assembly 46 are gathered into a single connector 52, such as a plastic female connector. The pigtail connector is complimentary to a connector on the vehicle 10. Connection between the assembly 46 and the vehicle 10 is made by pushing the two complimentary connectors onto each other. Alternatively, as will be developed more fully below, the connector 52 can constitute an integrally formed connector, in which the connector 52 is integrally formed on either the upper 48 or lower 50 housing member.

The preferred embodiment includes electronics 54 necessary for processing signals received from the impact sensor element 42. The electronics 54 are disposed either on the upper 48 or lower 50 housing member, or an electrical bread board secured to the upper 48 or lower 50 housing member by appropriate fasteners. The electronics 54 may include elements necessary to change a signal received from the impact sensor element 42 into a voltage signal. For example, as will be developed more fully below, the preferred embodiment includes a bend sensitive resistance element, which provides an altered resistance output upon deformation. Preferably, the electronics 54 contain elements, such as a current pump and voltage divider, to change the altered resistance into a voltage output, which can subsequently be relayed to the restraints control module 38.

The preferred embodiment of the present invention provides an impact sensor assembly 46 with features designed specifically for deformation impact sensor elements. This category of impact sensors includes bend sensitive resistance elements and bend sensitive fiber optic sensors as well as piezoelectric cables. Deformation sensors are able to detect vehicle impact events through direct physical involvement in the impact event. When the sensor bends or is deformed due to its direct involvement in the impact, an output signal of the sensor changes, giving an indication of the impact event. This change in output can be detected, and a deployment decision can be based thereon.

For example, bend sensitive resistance elements, such as the flexible potentiometer disclosed in U.S. Pat. No. 5,583,476 to Langford, provide electrical signals that vary as the element is deformed. Bend sensitive resistance elements have a strip of conductive material, such as ink, that provides a resistance output that varies with the extent of deformation of the element. The conductive material is typically disposed on a flexible substrate, such as polyamide. As the element is increasingly bent or deformed, the resistance of the element correspondingly increases. This change in resistance can be detected, and deployment of passive restraints can be initiated. A bend sensitive resistance element is only one example of the deformation sensors for which the preferred embodiment is particularly well-suited. As such, the specific example of a bend sensitive resistance element is only illustrative in nature and is not intended to limit the scope of the present invention in any way.

Due to this mode of operation, positioning of a deformation sensor within a housing can be critical. For example, if a deformation sensor cannot bend or deform in response to an impact event, a change in output cannot occur, and the impact may go undetected. In the preferred embodiment, the channel 58 is deep enough to accommodate a layer of compressible material 64 in addition to the sensor element 42. Preferably, the compressible material 64 is a layer of foam in the form of a strip. The compressible material 64 is positioned underneath the sensor element 42, i.e., at the bottom of the channel 58, and may include an adhesive backing or other suitable means to facilitate its proper placement and securement.

The compressible material 64 responds to pressure by compressing inward. It is preferable that the compressible material 64 provides sufficient compliance for the sensor element 42 to bend in response to an impact event.

Figure 3:
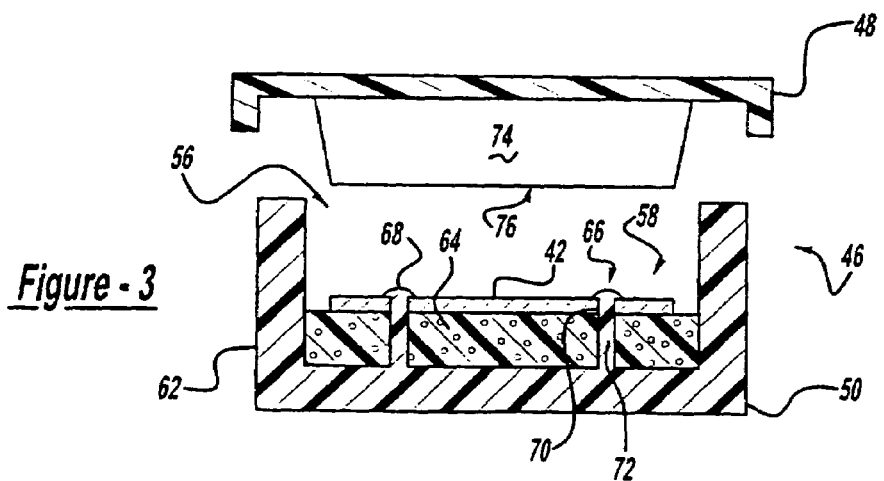
FIG. 3 is a cross-sectional view of a sensor assembly, taken along 3—3 of FIG. 2, in accordance with the present invention.
Figure 4:
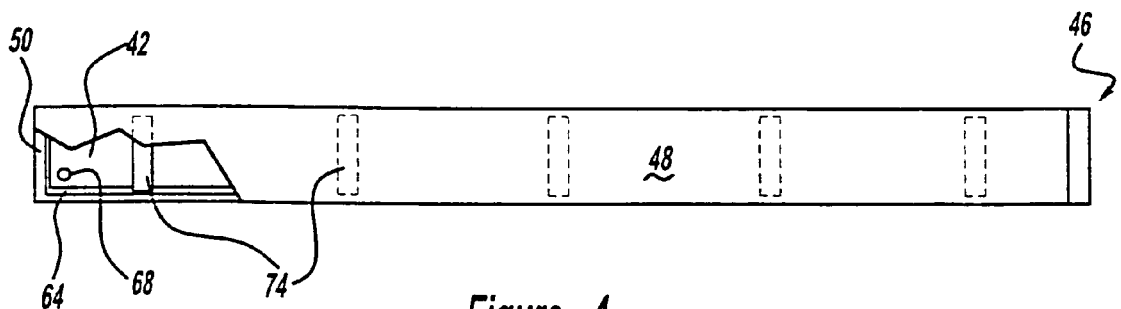
FIG. 4 is a top view of a sensor assembly, with a portion of the upper housing member broken away, in accordance with the present invention.

Deformation sensors also must be positioned in a manner that allows them to respond to an impact. That is, the sensor element 42 is not mounted such that a constant tensile load is applied. The lower housing member 50 of the preferred embodiment therefore defines structural elements capable of loosely retaining the sensor element 42 within the channel 58. Preferably, as shown in FIG. 3, the lower housing member 50 defines upstanding nobs 66 having a head region 68 slightly larger in diameter than that of a corresponding positioning hole 70 in the sensor element 42. The upstanding nobs 66 have a narrow shaft portion 72 considerably smaller in diameter than that of the positioning holes 70. The height of the shaft portion 72 is such that the head region 68 lies above the compressible material 64 and the sensor element 42, thereby retaining both in position. Preferably, the lower housing member 50 has four such upstanding nobs 66, one in each corner of the channel 58, but any number of upstanding nobs 66 suitable for accomplishing the desired retention may be utilized. The compressible material 64 has a corresponding slot or hole for receiving each upstanding nob 66, and the sensor element 42 has a corresponding positioning hole 70 for each upstanding nob 66. So configured and positioned, the shaft portions 72 of the upstanding nobs 66 are enclosed by the slots or holes of the compressible material 64 such that little or no freedom of movement is imparted onto the compressible material 64. The shaft portions 72 of the upstanding nobs 66 lie within the smaller diameter positioning holes 70 of the sensor element 42, with the larger diameter head region 68 lying over the positioning holes 70. This arrangement allows the sensor element 42 to move freely in all directions, confined only by the difference between the diameter of the shaft portion 72 of the upstanding nobs 66 and that of the positioning holes 70 of the sensor element 42. This freedom of movement provides the give necessary for proper functioning of a deformation sensor. That is, it allows the sensor element 42 to move and deform in response to an impact event.

In this embodiment, the final placement of the sensor element 42 can be achieved by applying pressure to the sensor element 42 near each positioning hole 70 until the head region 68 is forced through the positioning hole 70.

Alternatively, the upstanding nobs 66 can constitute separate members that are fixedly attached, such as by adhesive or as a threaded fastener, to the lower housing member 50. In this embodiment, the compressible material 64 and sensor element 42 can be positioned first, with the positioning holes 70 of the sensor element 42 overlying the slots or holes of the compressible material 64. The upstanding nobs 66 can then be passed through the positioning holes 70 and slots, and finally secured to the lower housing member 50, as appropriate.

Figure 5:
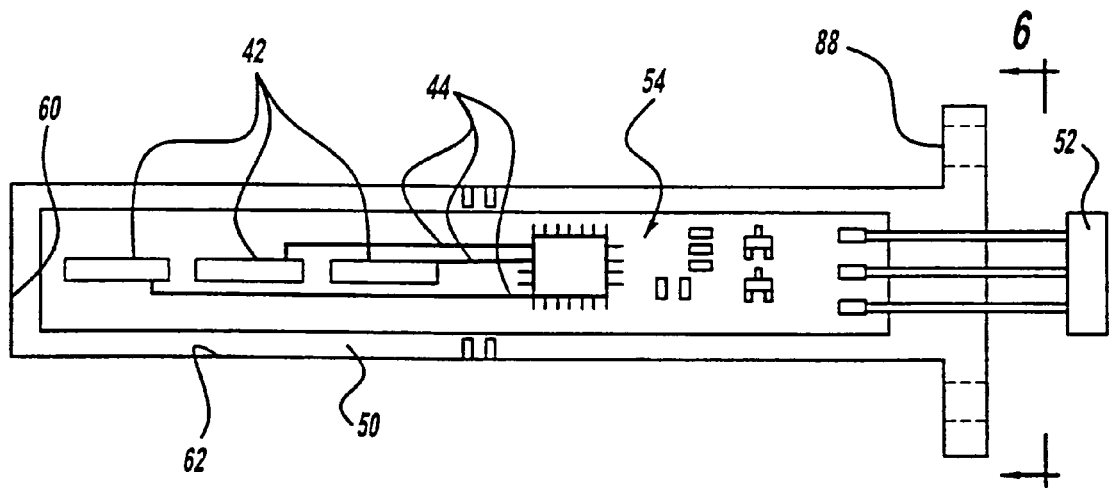
FIG. 5 is a top view of a bottom housing member, with an associated sensor element, of an impact sensor assembly in accordance with the present invention.
Figure 6:
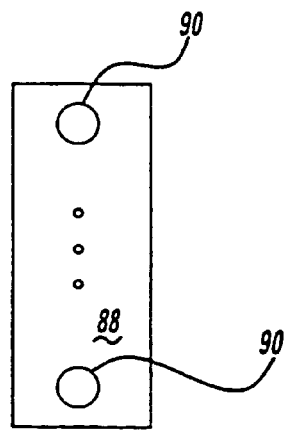
FIG. 6 is an end-on view of an assembly in accordance with the present invention.

It will be appreciated that the assembly 46 of the present invention can include more than one sensor element 42. For example, as shown in FIG. 5, a plurality of individual sensor elements 42 can be horizontally disposed, i.e., laid end to end, within the channel 58. In this manner, several individual sensor elements 42 are encased within the upper 48 and lower 50 housing members, facilitating installation of a plurality of sensor elements 42 into the vehicle 10.

The upper housing member 48 of the preferred embodiment also assures the proper functioning of a deformation sensor. In the preferred embodiment, the upper housing member 48 defines crush actuators 74. Preferably, the crush actuators 74 are projections extending from the interior of the upper housing member 48 toward the lower housing member 50. That is, the crush actuators 74 extend outward from the interior of the upper housing member 48 and have a work surface 76 facing the sensor element 42 laid within the channel 58 of the lower housing member 50. Somewhat less preferred, the crush actuators 74 can extend outward from the exterior surface of the upper housing member 48. In this embodiment, the force of an impact event forces the crush actuator 74 through the upper housing member 48 and into the sensor element 42 causing deformation of the sensor element 42.

The crush actuators 74 operate to address the problem associated with sensor-wide impact events. When these impact events are applied to a deformation sensor, bending or deformation may not occur. Rather, the entire sensor element 42 may simply be pushed inward. In this situation, no change in output occurs, which is necessary for proper functioning of the deformation sensor. The crush actuators 74 ensure that some deformation occurs because, as projections extending toward the sensor element 42, the crush actuators 74 force the sensor element 42 to bend when a force is applied to the upper housing member 48 regardless of whether the force is localized or spans the entire length of the sensor element 42. The force causes the crush actuator 74 to move inward, which, in turn, forces the sensor element 42 to bend and deform as the crush actuator 74 continues inward.

To ensure maximum deformation due to inward force on a crush actuator 74, the work surface 76 of the crush actuator 74 is preferably at least as wide as the width of the sensor element 42. Therefore, the crush actuators 74 preferably have a flat work surface 76 and are preferably trapezoidal, square or rectangular in shape. The crush actuators 74 may, of course, take on any geometric shape suitable for transferring the force of an impact event to a deformation sensor element.

In the preferred embodiment, the upper housing member 48 defines a plurality of crush actuators 74. To assure detection of a sensor-wide impact, crush actuators 74 are preferably positioned equidistant from each other, and are located along the entire length of the sensor element 42. It should be noted, though, that the crush actuators 74 can be arranged in any order and/or pattern appropriate for the sensor element(s) 42 disposed within the assembly 46.

The upper 48 and lower 50 housing members can also act as a substrate for the sensor element 42, effectively eliminating required materials and manufacturing steps. For example, as discussed above, bend sensitive resistance elements typically utilize a conductive material, such as ink, with electrical connectors printed onto a flexible substrate. Either the upper 48 or lower 50 housing member can be utilized as a substrate in place of the flexible substrate. Preferably, the upper housing member 48 is utilized as the substrate. As best illustrated in FIG. 5, the sensor element 42 in this embodiment is deposited directly onto the upper housing member 48, by any suitable means, such as direct printing. Also, the electrical connections 44, such as silver traces, are directly placed on the upper housing member 48. This use of the upper housing member 48 as a substrate eliminates the need for a polyamide flexible substrate and a layer of compressible material 64. Consequently, this produces a cost savings in the manufacturing of sensor elements 42 and assemblies 46. In this embodiment, the upper 48 and the lower 50 housing members are preferably thin in order to maintain flexibility. A thickness of approximately 1 to 3 mm is suitable.

The upper 48 and lower 50 housing members of the preferred embodiment also have structural features that ensure proper installation and facilitate securement to the vehicle 10. First, the lower housing member 50, which is ultimately positioned such that it faces the passenger compartment 16 of the vehicle 10, defines a projecting key 78. The projecting key 78 preferably is a relatively small, outwardly extending member that defines a profile 80. The shape of the profile 80 is complementary to that of a keyed opening 82 in the frame of the vehicle 10, if necessary, and also to that of an opening in a mounting member 84, or more specifically, to that of a throat region 86 of a c-channel used to secure the assembly 46 to the vehicle 10. This correlation of shapes between the profile 80 of the projecting key 78 and an opening in a mounting member 84 used for mounting and, if necessary, a keyed opening 82 in the frame of the vehicle 10 ensures proper orientation of the sensor element 42 following installation. This is important with sensor elements 42, such as bend sensitive resistance elements, that function only upon bending in one direction.

Figure 8:
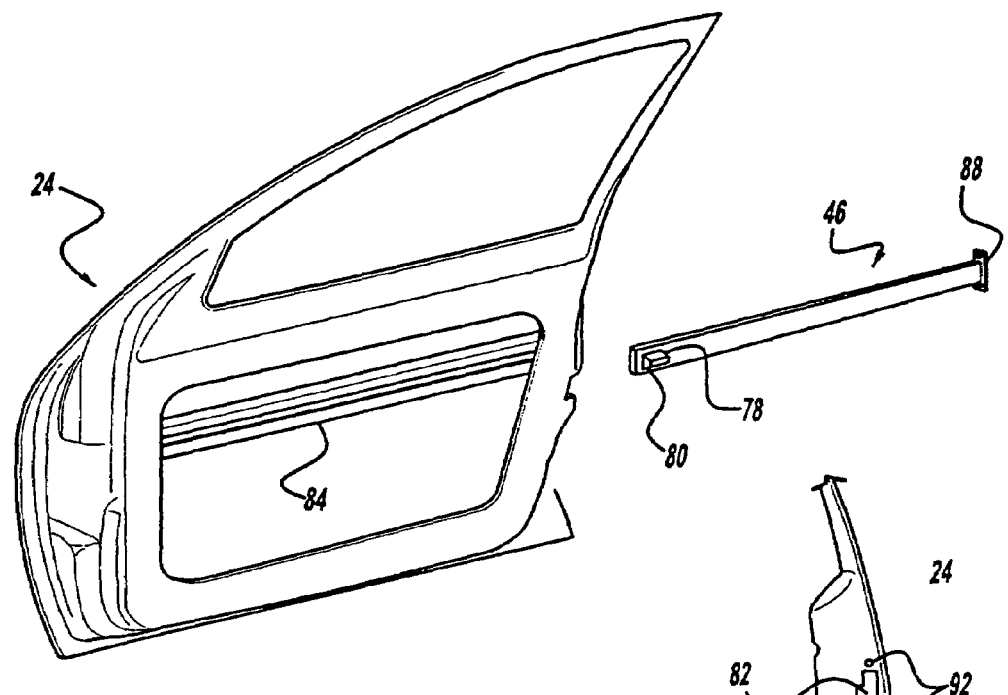
FIG. 8 is a schematic side view of a vehicle door with a mounting member for receiving an assembly in accordance with the present invention.
Figure 9:
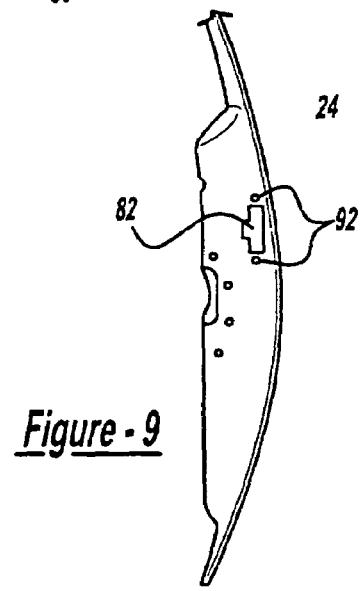
FIG. 9 is a schematic end-on view of a vehicle door with a mounting member for receiving an assembly in accordance with the present invention.

Preferably, the profile 80 of the projecting key 78 is square or rectangular in shape. Also preferably, the projecting key 78 is integrally formed by the lower housing member 50. Alternatively, of course, the projecting key 78 can be defined by the upper housing member 48, cooperatively defined by both the upper 48 and lower 50 housing members, or be a separate member fixedly attached to the upper 48 or the lower 50 housing member by any suitable means. As illustrated in FIG. 8, the projecting key 78 need only be relatively small in length as compared to the overall assembly 46. For proper functioning, the projecting key 78 need only be long enough to secure one end of the assembly 46 in a mounting member 84 for mounting. Also, the projecting key 78 need only be disposed at one end of the assembly 46. While not necessary, however, the projecting key 78 may span the entire length of the assembly 46.

The projecting key 78 can also take on another function. As indicated above, the connector 52 can be integrally formed on either the upper 48 or lower 50 housing member. When integrally formed on the lower housing member 50, the projecting key 78 can serve as the integrally formed connector 52. In this embodiment, the integrally formed connector defines pin hole electrical connectors into which male connecting pins from the vehicle 10 are inserted to form a connection. Serving as the integrally formed connector does not inhibit or alter the ability of the projecting key 78 to assure proper orientation of the assembly 46 during installation. The pin hole electrical connectors are accessible through the narrow throat region 86 of the c-channel when the assembly is slid into the c-channel for mounting. A mounting member 84 having a form other than that of a c-channel allows access to the integrally formed connector through an opening, recess or the like.

The assembly 46 also has a plate 88 with through passageways 90 for securing the assembly 46 to the vehicle 10. The plate 88 is a square or rectangular face disposed on one end of the assembly 46. The plate 88 is of sufficient size to prevent the assembly 46 from sliding further into the mounting member 84 once the plate 88 is reached. The plate 88 defines at least one through passageway 90 and preferably defines two, four or six such through passageways 90. The through passageways 90 are of sufficient size to allow a suitable threaded fastener or other connector to pass through the through passageway 90 while still retaining the head portion of such connector adjacent the plate 88. The through passageways 90 are arranged in a pattern such that each aligns with a through opening 92 of similar size on the portion of the vehicle 10 where the assembly 46 is being installed. The through passageways 90 can be offset, i.e., varying in distance from the edge of the plate 88, to further ensure proper orientation of the assembly 46 during installation. The plate 88 is disposed at one end of the assembly 46. In the preferred embodiment and best illustrated in FIG. 8, the plate 88 is disposed at the end opposite the end on which the projecting key 78 is disposed. Preferably, as illustrated in FIG. 2, the upper 48 and lower 50 housing members cooperatively define the plate 88. In this embodiment, the lower housing member 50 defines a lower plate member 94 and the upper housing member 48 defines an upper plate member 96. When the upper 48 and lower 50 housing members are connected to eachother, the complete plate 88 is formed. Alternatively, either the upper 48 or lower 50 housing member can define the plate 88 in toto. Also alternatively, the plate 88 can be a separate member fixedly attached to the assembly 46 by appropriate means.

Now turning to the method of attaching the impact sensor assembly 46 of the present invention to a vehicle 10. The method of attaching the impact sensor assembly 46 of the present invention to a vehicle 10 comprises the following steps. First, an impact sensor assembly 46 according to the present invention is selected. The sensor assembly 46 has a sensor element 42 and an electrical connector 52 and has been fully assembled. That is, the sensor element 42 has been appropriately situated in the channel 58 or disposed directly on the lower housing member 50, and the upper 48 and lower 50 housing members have been closed upon eachother. Also, for the preferred method of attachment, the assembly 46 has the structural features detailed above, i.e., a projecting key 78 and a plate 88.

Next, a mounting member 84 is selected. The mounting member 84 is a structural element preferably composed of metal similar to that used for the structural reinforcement elements of the vehicle 10. The dimensions of the mounting member 84 are complimentary to the overall dimensions of the assembly 46 such that the mounting member 84 can slideably receive and retain the assembly 46. That is, the mounting member 84 has a main opening that is slightly larger than the cross-sectional dimensions of the assembly 46. Preferably, the mounting member 84 is a c-channel, i.e., a channel member having a cross-sectional profile in the shape of a letter "c". The "c" shaped profile is defined by two opposed flanges that form a narrow throat region 86. The main opening of the c-channel is of a shape complimentary to the cross-sectional dimensions of the assembly 46. The main opening has dimensions suitable for receiving the assembly 46 of the present invention in a slideable manner. The narrow throat region 86 is wide enough to accommodate the profile 80 of the projecting key 78 which may define an integrally formed connector, as indicated above, but narrow enough to inhibit rotation of the projecting key 78 therein. The c-channel is of a length sufficient for slideably receiving the selected assembly 46 up to the plate 88.

In order to avoid imparting rigidity onto the assembly 46, the mounting member 84 can be scored at various locations along its length, effectively weakening the mounting member 84 to ensure its ability to allow deformation of the assembly 46 and included sensor element 42 upon impact. This also ensures that an impact event will be localized by preventing rounding off, i.e., a widened disbursement, of an impact event over a span of the c-channel.

Figure 7:
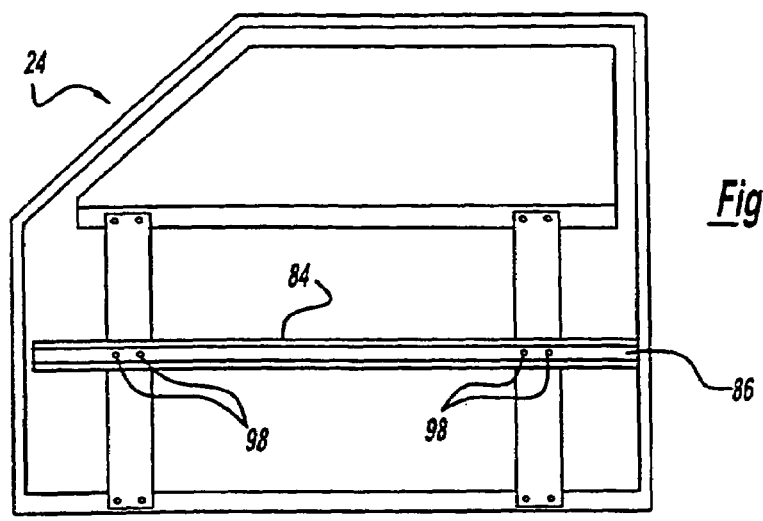
FIG. 7 is a schematic cross-section of a vehicle door having a mounting member for receiving an assembly in accordance with the present invention.

Next, the mounting member 84 is secured to the vehicle 10 at attachment points 98. Preferably, as best illustrated in FIG. 7, the attachment points 98 constitute spot welds between the mounting member 84 and vertical support members that can be attached to structural elements of the vehicle 10, such as reinforcement beams. Alternatively, threaded fasteners or other connectors, such as rivets, can be used to secure the mounting member 84 to the structural elements of the vehicle 10. Also alternatively, the attachment points 98 can be welds between the mounting member 84 and securement plates, with additional welds between the securement plates and structural elements of the vehicle.

After the mounting member 84 is secured to the vehicle 10, the sensor assembly 46 is slid into the mounting member 84. In the preferred method of assembly, the sensor assembly 46 is positioned with the projecting key 78 near an open end of the c-channel. The assembly 46 is slid into the main opening of the c-channel, while the profile 80 of the projecting key 78 is passed through the narrow throat region 86 once the projecting key 78 encounters the c-channel. The assembly 46 is slid completely into the c-channel, until the plate 88 prohibits further inward movement. At this point, the through passageways 90 of the plate 88 are aligned with the through openings 92 on the vehicle 10.

Next, a suitable fastener, such as a threaded sheet-metal screw or a threaded bolt or the like, is passed through each through passageway 90 in the plate 88 and into the corresponding through opening 92 in the vehicle 10. If necessary, such as with threaded bolts, a nut and washer, or other securement means, are attached to the portion of the fastener extending beyond the through opening 92 in the vehicle 10.

Lastly, the electrical connector 52 of the sensor assembly 46 is connected to the electrical connections 44 of the impact sensing system 40 of the vehicle 10. As indicated above, this step can include either mating the pigtail connector with a corresponding connector in the vehicle 10, or pressing an appropriate vehicle connector into the pinhole connectors of the integrally formed connector.

Following the establishment of the electrical connection between the assembly 46 and the vehicle 10, the installation and securement of the sensor assembly 46 is complete.

The foregoing disclosure is the best mode devised by the inventors for practicing the invention. It is apparent, however, that impact sensor assemblies and methods of attaching assemblies to vehicles incorporating modifications and variations will be obvious to one skilled in the art of impact sensors, systems and vehicle manufacturing. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims:

We claim:

1. A vehicle impact sensor assembly having a longitudinal axis, and first and second ends for monitoring impact events in a vehicle, comprising:
    a first housing member,
    a second housing member cooperating with said first housing member to define an interior compartment having an elongated channel,
    an elongated impact sensor element for providing signals of impact events upon deformation of said impact sensor, said impact sensor element disposed within said channel, and
    a connector for electrically connecting said impact sensor element to said vehicle, and
    wherein said first and second housing members closeably interact to deform said impact sensor element.

2. The vehicle impact sensor assembly of claim 1 further comprising electronics to process said signals from said impact sensor element.

3. The vehicle impact sensor assembly of claim 1 further comprising a layer of compressible material disposed within said elongated channel and under said elongated impact sensor element.

4. The vehicle impact sensor assembly of claim 1 wherein said first and second housing members cooperatively define a plate disposed in a perpendicular manner to said longitudinal axis at said first end of said impact sensor assembly and having at least one through passageway for securing said assembly to said vehicle.

5. The vehicle impact sensor assembly of claim 1 wherein said first housing member defines a plurality of localized projections disposed adjacent said impact sensor element, whereby sufficient impact exerted upon said first housing member causes said projections to engage said impact sensor element and induce localized deformation thereof.

6. The vehicle impact sensor assembly of claim 1 wherein said second housing member further defines at least one upstanding projection having a head region and a shaft portion, whereby said shaft portion extends through said elongated impact sensor element, and said head region engages and retains said elongated impact sensor element near said second housing member.

7. The vehicle impact sensor assembly of claim 1 wherein said second housing member further defines a projecting key disposed in a lateral manner to said longitudinal axis and disposed at said second end of said impact sensor assembly.

8. The vehicle impact sensor assembly of claim 1 wherein said impact sensor element is a bend sensitive element and is selected from the group consisting of piezoelectric cables, fiber optic deformation sensors, and resistance elements.

9. The vehicle impact sensor assembly of claim 1 wherein said connector comprises a pigtail connector.

10. The vehicle impact sensor assembly of claim 1 wherein said connector is integrally formed on said lower housing member.

11. A vehicle impact sensor assembly having a longitudinal axis and an elongate channel, said assembly being situated for monitoring impact events in a vehicle, comprising:
    an elongated deformation impact sensor element for providing signals of impact events upon deformation of said deformation impact sensor element, said deformation impact sensor element disposed within said channel,
    a first housing member defining a plurality of localized projections disposed adjacent said impact sensor element, whereby sufficient impact exerted upon said first housing member causes said projections to engage said impact sensor element and induce localized deformation thereof,
    a second housing member cooperating with said first housing member to define said channel,
    a layer of compressible material disposed within said channel and under said deformation impact sensor element, and
    a connector for electrically connecting said deformation impact sensor element to said vehicle,
    whereby said first and second housing members closeably interact to encase said deformation impact sensor element.

12. The vehicle impact sensor assembly of claim 11 further comprising electronics to process said signals from said deformation impact sensor element.

13. The vehicle impact sensor assembly of claim 11 wherein said first and second housing members cooperatively define a plate disposed in a perpendicular manner to said longitudinal axis at said first end of said impact sensor assembly and having at least one through passageway for securing said assembly to said vehicle.

14. The vehicle impact sensor assembly of claim 11 wherein said second housing member further defines at least one upstanding projection having a head region and a shaft portion, whereby said shaft portion extends through said compressible material and said elongated impact sensor element, and said head region engages and retains said elongated impact sensor element against said compressible material.

15. The vehicle impact sensor assembly of claim 11 wherein said second housing member further defines a projecting key disposed in a lateral manner to said longitudinal axis and disposed at said second end of said impact sensor assembly.

16. The vehicle impact sensor assembly of claim 11 wherein said deformation impact sensor element is a bend sensitive element and is selected from the group consisting of fiber optic deformation sensors, resistance elements, and piezoelectric cables.

17. The vehicle impact sensor assembly of claim 11 wherein said connector comprises a pigtail connector.

18. The vehicle impact sensor assembly of claim 11 wherein said connector is integrally formed on said lower housing member.

19. A method of installing an impact sensor assembly into a vehicle having at least one through opening for receiving fasteners from said impact sensor assembly, comprising the steps of:

provide an impact sensor assembly having an elongated longitudinal axis and first and second ends, a cross-sectional shape, an electrical connector and defining a plate disposed in a perpendicular manner to said longitudinal axis at said first end of said assembly and having at least one through passageway, providing an elongated mounting member having a surface and defining a main opening having a shape complimentary to said cross-sectional shape of said impact sensor assembly, securing said mounting member to said vehicle, placing said second end of said assembly into said main opening of said mounting member, sliding said impact sensor assembly along said longitudinal axis into said main opening of said mounting member until said plate prohibits further inward sliding, passing a fastener through said through passageway of said plate and into said through opening of said vehicle, and connecting said electrical connector of said impact sensor assembly to said vehicle.

20. The method of installing an impact sensor assembly into a vehicle according to claim 19, wherein said impact sensor assembly further defines a projecting key and said mounting member comprises a channel having a narrow throat region capable of slideably receiving said projecting key.

21. The method of installing an impact sensor assembly into a vehicle according to claim 19, wherein said mounting member is scored at various locations on said surface.

\* \* \* \* \*